July 29, 1952     E. E. MASTERSON     2,605,364
COMBINATION PHOTOGRAPHIC AND MAGNETIC
SOUND FILM PICTURE PROJECTOR
Filed Oct. 29, 1949                     2 SHEETS—SHEET 1

INVENTOR.
EARL E. MASTERSON
BY
ATTORNEY

July 29, 1952
E. E. MASTERSON
2,605,364
COMBINATION PHOTOGRAPHIC AND MAGNETIC
SOUND FILM PICTURE PROJECTOR
Filed Oct. 29, 1949
2 SHEETS—SHEET 2
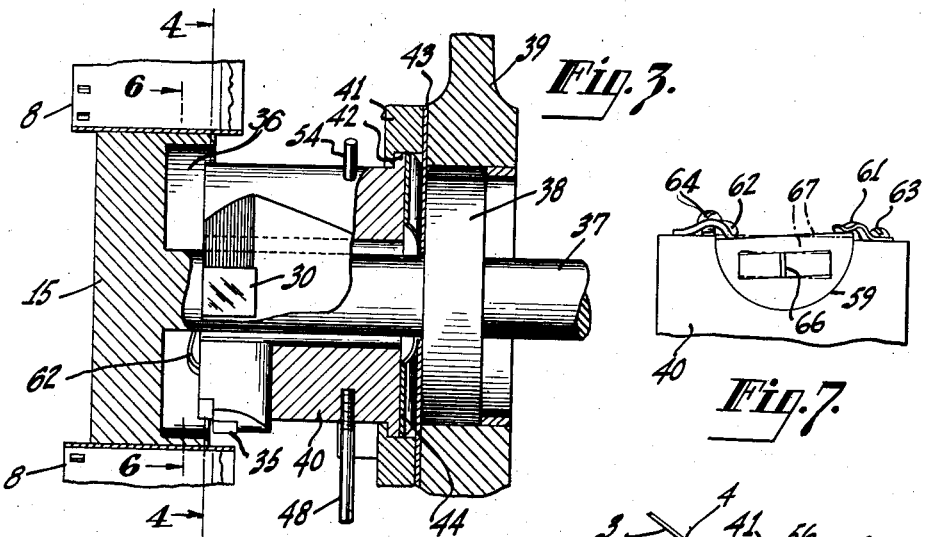
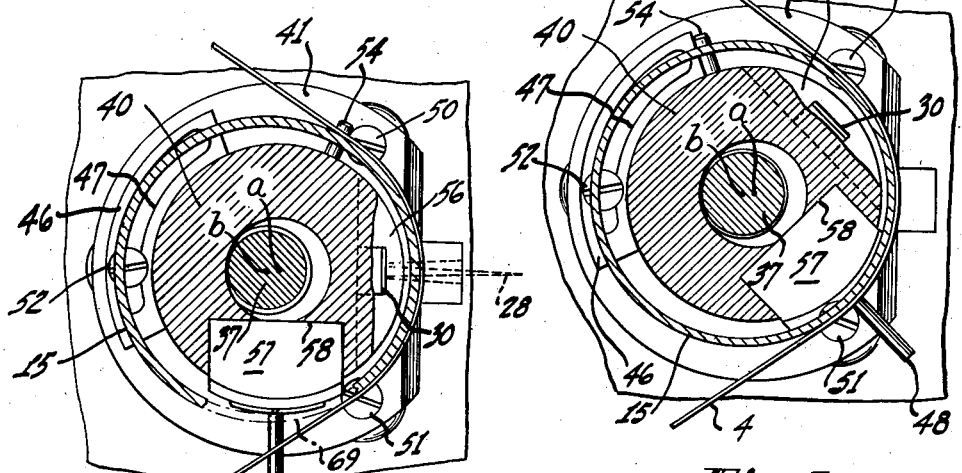
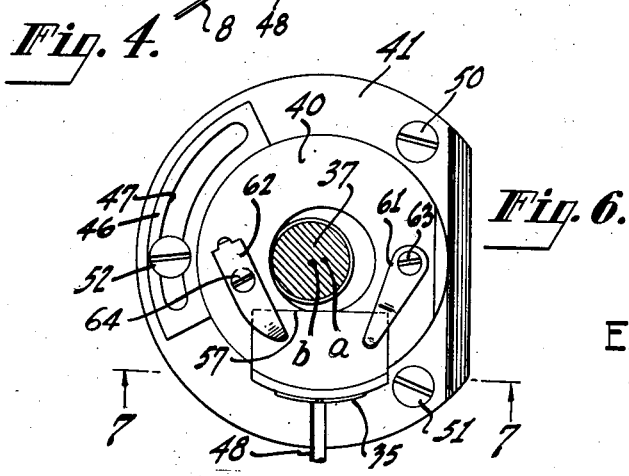
INVENTOR.
EARL E. MASTERSON
BY
ATTORNEY Patented July 29, 1952

2,605,364

UNITED STATES PATENT OFFICE 2,605,364

COMBINATION PHOTOGRAPHIC AND MAGNETIC SOUND FILM PICTURE PROJECTOR

Earl E. Masterson, Palmyra, N. J., assignor to Radio Corporation of America, a corporation of Delaware Application October 29, 1949, Serial No. 124,470

8 Claims. (Cl. 179—100.3)

1

This invention relates to motion picture sound apparatus, and to a combination motion picture projector and sound reproducer for motion picture sound film, particularly of the narrow or sixteen millimeter type of composite film having a single row of sprocket holes.

Projectors for motion picture films having photographic sound records thereon are well-known, the present invention, however, being directed to such a motion picture projector which may also reproduce motion picture film having a magnetic record in the area usually occupied by the photographic record. Therefore, the projector will reproduce a film with a photographic sound track, or, by a simple rotary adjustment, it will reproduce a film having a magnetic sound track thereon. This is accomplished by the use of an extremely small magnetic pick-up head or transducer, such as disclosed and claimed in Grantham co-pending application, Ser. No. 102,023, filed June 29, 1949, and the provision of a mounting unit therefor which also supports a light reflector. Thus, the projector is adaptable for sound reproduction from either type of sound record. The invention is disclosed as applied to a standard commercial type of motion picture projector for photographic sound records, such as the RCA-400 type, although it may also be adapted to other types of film projectors.

The principal object of the invention, therefore, is to facilitate the projection of motion pictures and the reproduction of sound from either photographic or magnetic film records.

Another object of the invention is to provide an improved combination motion picture and sound projector which may have the concomitant sound either as a photographic record or as a magnetic record on the film.

A further object of the invention is to provide an improved pickup system from either magnetic or photographic film records.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 3 is a cross-sectional view of a sound record change-over unit taken along the line 3—3 of Fig. 1.

Fig. 4 is a detail of the sound changeover mechanism in one adjusted position and taken along the line 4—4 of Fig. 3.

Fig. 5 is a view of the mechanism of Fig. 4 in another adjusted position.

Fig. 6 is an end view of the mounting mechanism for the changeover unit, and

Fig. 7 is a detailed view showing the azimuth adjusting mechanism for the magnetic head.

Figure 1:
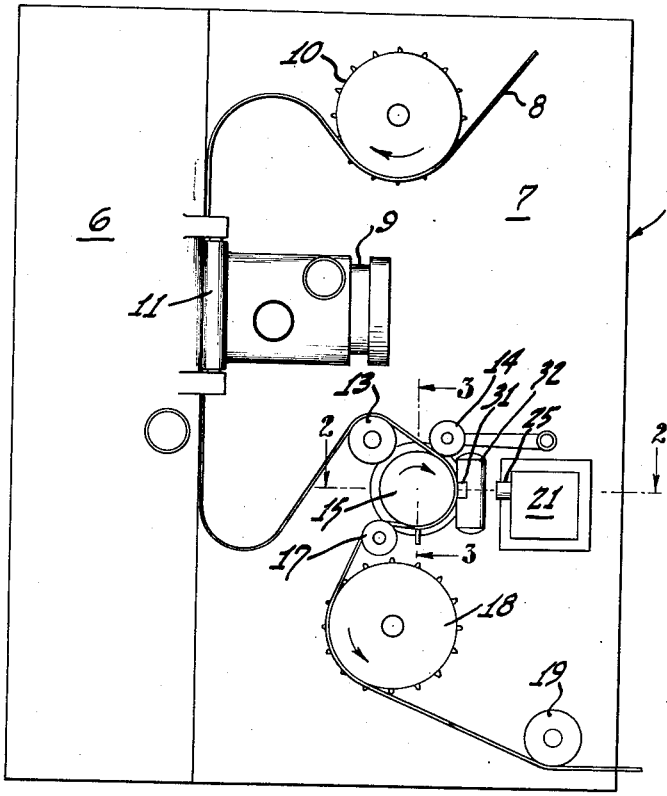
Fig. 1 is an elevational view of a standard type of motion picture projector embodying the invention.

Referring now to the drawings, in which the same numerals identify like elements, a standard motion picture unit is shown at 5, a section 6 thereof containing the projection light source, amplifier, and a section 7 containing the other necessary equipment for advancing and projecting a film 8 through the projection lens unit 9 having a gate section 11. The film is pulled from a supply reel by a sprocket 10 and advanced intermittently by a pull-down mechanism through the projection gate 11 over a roller 13, under a pressure roller 14, around a sound drum 15, over a filter roller 17, around a sprocket 18, and under a guide roller 19. The film is wound on the usual takeup reel, not shown.

Figure 2:
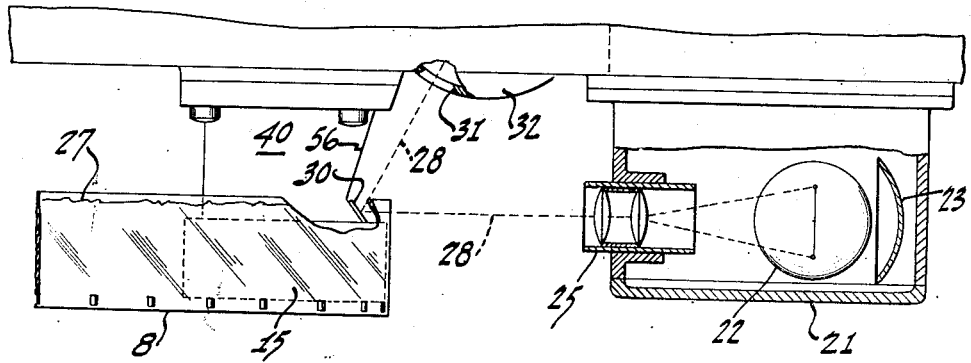
Fig. 2 is a cross-sectional view of the sound reproducing portion of the projector taken along the line 2—2 of Fig. 1.

Referring now to Figs. 1 and 2, showing the sound reproduction portion of the system, a lamp house 21 has a light source lamp 22 therein, the light being projected from the filament and reflected by reflector 23 through the objective lens unit 25. As shown in Figs. 2 and 3, the film 8 overhangs the sound drum 15, and, when a photographic record is in the position shown at 27, light, as shown by dotted line 28, is projected through the sound track to a mirror 30 from which is is reflected through a window 31 to a photoelectric cell within the housing 32. Thus, as the film is advanced intermittently through gate 11 and continuously past the light beam 28, the picture is projected and the sound reproduced in the normal manner, well-known in the art.

In sixteen millimeter motion picture film having a photographic track thereon, the sound track lies on the emulsion surface which faces the light source 22, while, when a magnetic track is applied to such a film, it is on the base or opposite side of the film. Thus, to provide a combination photographic and magnetic track reproducing unit for the projector, the magnetic unit must be positioned within the drum 15 so as to contact the magnetic track. This is provided for by the adjustable unit shown in detail in Figs. 3 to 6, inclusive, wherein either the mirror 30 may be positioned behind the sound track edge of the film 8, as shown in Figs. 2 and 4, or the magnetic head 35, disclosed and claimed in the above mentioned co-pending application, may be positioned in contact with a magnetic record 3 on the film 4, as shown in Fig. 5. The drum 15 is under-cut, as shown at 36, and is mounted on a shaft 37 in a ball bearing 38 within an opening in the frame 39 of the projector.

The magnetic head and mirror mounting bracket 40 is shown attached to a mounting ring 41 by overlapping flanges, as shown at 42, so that the bracket is rotatable around the longitudinal axis of the ring 41. Between the ring 41 and frame 39, is a spacing washer 43, and between the bracket 40 and spacer 43, is a spring washer 44 to maintain the bracket in fixed longitudinal and rotatable position. The ring is attached to the frame by suitable screws 50, 51, and 52, an adjustable, curved stop sector 46 having a slot 47 therein being held by a screw 52 on the ring 41 and providing the proper stopping position for accurately locating the head 35 when the bracket 40 is rotated slightly less than ninety degrees by means of a shifting lever 48. That is, the operating position of the head 35 is determined by engagement of the pin 54 with the upper end of the sector 46, as viewed in Fig. 5. To bring the mirror 30 into operating position, the bracket 40 is rotated clockwise until the pin 54 engages the head of the screw 50.

The portion of bracket 40 is cut away, as shown at 56, to permit light from the mirror 30 to be projected to the window 31. At approximately ninety degrees from the mirror 30 is a slot 57 having a flat surface section 58 and a curved surface section 59 (see Fig. 7), in which the magnetic head 35 is positioned. The head is held in the slot 57 by an azimuth determining spring 61 and a stop 62 held, respectively, on the bracket 40 by screws 63 and 64. The spring 61 exerts a constant pressure on the head to force it against the stop 62, and the stop 62 may be adjusted to rotate the gap 66 in the head in either direction to make it perpendicular to the motion of the film 4. The broken lines 67 show this adjustment.

Thus, to reproduce the film 8 carrying a photographic sound track, the shifting lever 48 is thrown to the position shown in Fig. 4, abutting the pin 54 against the screw 50, so that the mirror 30 will reflect the light beam 28 passing through the film to the photoelectric cell, as shown in Figs. 2 and 4. To reproduce the film 4 with a magnetic record 3, the lever is thrown to the position shown in Fig. 5, the stop pin 54 abutting the upper end of the sector 46, the magnetic head 35 then contacting the film. To secure the desired contact between the head and magnetic track, the bracket 40 has an axis of rotation at point $a$ whereas the axis of rotation of the shaft 37 and drum 15 is at point $b$. Thus, when the reproduce head 35 is in the position shown in Fig. 4, it is spaced from the outside surface of the rim of the drum 15, as shown by broken line 69, and when rotated to the position shown in Fig. 5, it is moved radially with respect to the drum, and thus, makes firm contact with the magnetic record material on the film.

I claim:

1. A sound reproducing unit for magnetic film records, comprising a sound drum, means for advancing film over said drum, a bracket mounted on an axis parallel with the axis of said drum and having a portion extending within said drum, a magnetic reproducing head mounted on said bracket, and means for rotating said bracket to position said head in two positions substantially ninety degrees apart, said head contacting said film in one of said positions.

2. A sound reproducing unit in accordance with claim 1, in which said axis of rotation of said bracket is spaced from the axis of rotation of said drum, said magnetic head being spaced from said film in one position and contacting said film in another position.

3. A sound reproducing unit for a motion picture projector, comprising a sound drum, means for advancing a motion picture film over said drum, a shaft for said drum, a rotatable bracket surrounding said shaft, said bracket rotating on an axis parallel with and spaced from the axis of said shaft, a magnetic head mounted on said bracket, means for rotating said bracket to position said head in two positions substantially ninety degrees apart, and means for predetermining the stopping positions of said bracket and stopping said bracket at said positions.

4. A rotatable mount positioned partially within a film supporting drum over which a portion of film passing thereover hangs comprising a frame, a ring attached to said frame and having an internal flange thereon, a substantially cylindrically shaped bracket having an external flange at one end adapted to contact said internal flange of said ring, resilient means for applying pressure to said ring and bracket for maintaining the contacting surfaces of said flanges thereof in contact, an element on a portion of one end of said bracket under the overhanging portion of said film, and a second element on said portion spaced approximately ninety degrees from said first element.

5. A rotatable mount in accordance with claim 4, in which means are provided for adjusting the position of said second mentioned element on said bracket.

6. In a motion picture projector and sound reproducing system in which a film is intermittently advanced at one position and continuously advanced at another position, a sound reproducing structure comprising a rotatable sound drum at said other position over which said film passes, a light source, means for directing light through the sound track portion of said film as it passes over said drum, a shaft for said drum, a photocell adjacent said drum, a bracket having a portion adjacent said film as it passes over said drum, a mirror on the side of said film opposite said light source for reflecting light emerging from said film to said photocell, a magnetic sound reproducing head on said bracket adapted to be moved into contact with said film, and means for rotating said bracket.

7. A motion picture projector and sound reproducer in accordance with claim 6, in which said bracket rotating means includes overlapping flanges, the axis of rotation of one of said flanges being parallel with and spaced from the axis of said drum shaft.

8. A rotatable mount in accordance with claim 4, in which said first mentioned element is a mirror and said second mentioned element is a magnetic head.

EARL E. MASTERSON.

REFERENCES CITED

The following references are of record in the file of this patent:

UNITED STATES PATENTS

| Number | Name | Date |
| --- | --- | --- |
| 1,883,907 | Hathaway | Oct. 25, 1932 |
| 2,095,831 | Philips | Oct. 12, 1937 |
| 2,479,868 | Rossmann | Aug. 23, 1949 |
| 2,479,869 | Rossmann | Aug. 23, 1949 |
| 2,480,162 | Rath | Aug. 30, 1949 |
| 2,485,839 | O'Dea | Oct. 25, 1949 |